(12) United States Patent
Glaser

(10) Patent No.: US 8,709,272 B2
(45) Date of Patent: Apr. 29, 2014

(54) MIXTURE, ESPECIALLY SPINNING SOLUTION

(75) Inventor: Josef Glaser, Helfenberg (AT)

(73) Assignee: Helfenberger Immobilien LLC & Co Textilforschungs- und Entwicklungs KEG, Helfenberg (AT)

( * ) Notice: Subject to any disclaimer, the term of this patent is extended or adjusted under 35 U.S.C. 154(b) by 185 days.

(21) Appl. No.: 12/673,663

(22) PCT Filed: Aug. 14, 2008

(86) PCT No.: PCT/AT2008/000288
§ 371 (c)(1),
(2), (4) Date: Feb. 16, 2010

(87) PCT Pub. No.: WO2009/021259
PCT Pub. Date: Feb. 19, 2009

(65) Prior Publication Data
US 2011/0040029 A1    Feb. 17, 2011

(30) Foreign Application Priority Data
Aug. 16, 2007  (AT) .......................................... 1284/07

(51) Int. Cl.
*D06M 13/02* (2006.01)
*D06M 13/224* (2006.01)
*B29C 47/00* (2006.01)
*B29C 47/12* (2006.01)

(52) U.S. Cl.
USPC .................................... 252/8.86; 264/177.11

(58) Field of Classification Search
USPC ..................... 264/177.11; 252/8.86
See application file for complete search history.

(56) References Cited

U.S. PATENT DOCUMENTS

| 1,955,825 A | | 4/1934 | Palmer |
| 2,025,434 A | * | 12/1935 | Bouhuys ....................... 428/389 |
| 2,650,168 A | | 8/1953 | Van Dijk et al. |
| 2,946,761 A | | 7/1960 | Schuller et al. |
| 3,298,962 A | * | 1/1967 | Chiddix et al. ................. 516/69 |
| 4,243,574 A | | 1/1981 | Manwiller |
| 4,598,119 A | | 7/1986 | Volk et al. |
| 4,769,268 A | | 9/1988 | Burton |
| 5,827,797 A | * | 10/1998 | Cass et al. ..................... 505/430 |
| 5,928,785 A | | 7/1999 | Nishida et al. |
| 5,932,158 A | * | 8/1999 | Boerstoel et al. .......... 264/176.1 |
| 6,232,371 B1 | | 5/2001 | Caswell et al. |

(Continued)

FOREIGN PATENT DOCUMENTS

| DE | 825450 | 12/1951 |
| DE | 953830 | 12/1956 |

(Continued)

OTHER PUBLICATIONS

Wendler et al. (Macromol. Mater. Eng. 2005, 290, 826-832).*

(Continued)

*Primary Examiner* — Liam Heincer
(74) *Attorney, Agent, or Firm* — Young & Thompson

(57) ABSTRACT

A mixture includes a polymer solution, especially a cellulose solution, a first additive in the form of an inorganic lubricant and/or stabilizer, for example graphite, and a second additive as an adsorbent, for example activated carbon. The inorganic lubricants and/or stabilizers do not weaken the positive properties of the adsorbent but can even improve them. The mixture can be used to produce fibers (7) or moldings.

5 Claims, 3 Drawing Sheets

(56) References Cited

U.S. PATENT DOCUMENTS

| | | | |
|---|---|---|---|
| 6,235,392 B1 * | 5/2001 | Luo et al. | 428/369 |
| 6,395,080 B1 * | 5/2002 | Cass et al. | 106/166.01 |
| 7,449,517 B1 * | 11/2008 | Rock | 525/35 |
| 2002/0113336 A1 * | 8/2002 | Cass et al. | 264/187 |
| 2002/0192251 A1 * | 12/2002 | Collin | 424/401 |
| 2003/0193109 A1 * | 10/2003 | Zikeli et al. | 264/187 |
| 2005/0015889 A1 * | 1/2005 | Zikeli et al. | 8/156 |
| 2006/0144062 A1 * | 7/2006 | Zikeli et al. | 62/190 |
| 2007/0026228 A1 * | 2/2007 | Hartmann et al. | 428/402.2 |
| 2007/0210481 A1 * | 9/2007 | Zikeli et al. | 264/176.1 |
| 2008/0045413 A1 * | 2/2008 | Ko et al. | 502/418 |
| 2008/0245376 A1 * | 10/2008 | Travers et al. | 131/280 |
| 2011/0040029 A1 * | 2/2011 | Glaser | 524/612 |

FOREIGN PATENT DOCUMENTS

| | | |
|---|---|---|
| DE | 1059612 | 6/1959 |
| DE | 1261274 B | 8/1968 |
| DE | 10024540 | 1/2001 |
| DE | 10324232 | 12/2004 |
| DE | 10324232 A1 * | 12/2004 |
| DE | 69727766 T2 | 12/2004 |
| EP | 0085413 | 8/1983 |
| EP | 1542240 | 6/2005 |
| FR | 2452511 | 10/1980 |
| GB | 1027670 | 4/1966 |
| JP | 3043456 | 2/1991 |
| WO | 9323459 | 11/1993 |
| WO | 2005007946 | 1/2005 |

OTHER PUBLICATIONS

Machine Translation of DE 100324232, 2012.*
International Search Report of PCT/AT2008/000288, mailed on Jul. 17, 2009.

* cited by examiner

MIXTURE, ESPECIALLY SPINNING SOLUTION

The invention relates to a mixture that contains a solution with at least a first and a second additive.

The invention further relates to the use of this mixture for producing fibers or molded parts.

Moreover, the invention relates to a fiber and a molded part containing at least one base material and at least a first and a second additive.

It is known to use—as protective textiles—textile sheet materials that consist of fibers in which at least the surface layer has activated carbon, based on the adsorption property of activated carbon. In the production of such fibers from a spinning solution, it is disadvantageous that only very short fibers can be produced because of the inadequate gliding property of the spinning solution that results from the high friction of the activated carbon surface. This negative circumstance is also reinforced by the formation of agglomerates of activated carbon, which results in a "tearing" of the fibers. In addition, it is disadvantageous in these fibers with activated carbon that they are also very difficult to spin in particular because of the high friction of the activated carbon surfaces, i.e., it is difficult to further process them into threads, from which then, with conventional methods of textile processing, sheet materials, such as, e.g., woven materials, protective clothing, electrically non-conductive products, etc., can be formed.

In order to be able to produce a yarn that consists of several individual fibers from a spun fiber, a certain frictional coefficient of the fibers below one another should not be exceeded. To this end, it is known to use, during production of such fibers, so-called finishes that improve the non-clinging effect of the fibers, with which the spinning performance of the fibers is considerably improved. Finishes are organic lubricating agents, whereby in the production of fibers, in particular more significant soaps and oils from the mineral oil industry are used. It is disadvantageous in these finishes that they saturate activated carbon while reducing their adsorption property, by which the intended properties of the fibers to be produced are negatively influenced since activated carbon is only capable to a limited extent of the adsorption of other materials.

If no finish is used, the above-mentioned disadvantage relative to the spinning performance exists, such that as a result, mainly very short fibers can be produced, which fibers cannot be directly spun into a yarn that consists of several individual fibers. Such short fibers are, for example, felts.

In the case of the spinning solution, the problem exists, moreover, that the latter is unstable temperature-wise because of the high friction of the activated carbon surface, which can result in a drastic increase of the temperature of the solution or mixture (onset temperature) until the solution or mixture self-ignites.

Even in molded parts, in which at least the surface layer has activated carbon, the above-mentioned disadvantages occur, such that the basic solution or mixture is unstable temperature-wise and such that when using organic lubricating agents, the adsorption property of activated carbon is reduced.

The object on which the invention is based is to make available a mixture of the above-mentioned type, with which the above-mentioned disadvantages are avoided to a very great extent.

In addition, the invention is based on the object of making available applications of this mixture as well as a fiber and a molded part, in which the above-mentioned disadvantages are avoided to a very great extent.

As far as the mixture is concerned, the object according to the invention is achieved with a mixture that has the features of Claim 1.

As far as the applications are concerned, the object according to the invention is achieved with applications that have the features recited in the claims.

Preferred and advantageous embodiments of the process according to the invention are the subject of the subclaims.

As the result of an inorganic lubricating and/or stabilizing agent being used in the solution in addition to the additive, it is achieved that the gliding properties of fibers or molded parts are improved without the properties of the second additive, in particular the adsorption properties, being negatively influenced by the lubricating and/or stabilizing agents. The advantage has been shown, surprisingly enough, that the adsorption properties of the corresponding additive are even improved by the presence of an inorganic lubricating and/or stabilizing agent. With the improvement of the gliding properties without impairing the adsorption properties, it is now also possible to produce long fibers, such as, e.g., even continuous fibers, in which at least the surface layer has activated carbon; in particular, a reduced agglomerate formation of activated carbon greatly reduces the risk that the fiber "tears."

Also, the stability of the solution considerably improves through the use of an inorganic lubricating and/or stabilizing agent, such as graphite. In particular, the temperature stability of the solution or the mixture is considerably improved, which in practice represents an important quality feature.

In an especially preferred embodiment of the invention, the inorganic lubricating and/or stabilizing agents can be selected from the group that consists of graphite, molybdenum sulfide or boron nitride, whereby these materials can be used by themselves or else can be combined with one another in any way desired. In this case, graphite acts both as a lubricating agent and as a stabilizing agent, molybdenum sulfide or boron nitride primarily only as a lubricating agent. Within the scope of the invention, other inorganic lubricating and/or stabilizing agents that have a positive influence on the gliding properties of fibers or molded parts without their adsorption property being impaired in a negative fashion and/or that optionally also have a chemically-stabilizing action are also conceivable.

Advantageously, the second additive can be selected from adsorption agents that are already known for fiber production, in particular from the group that consists of activated carbon, diamond, gold, silver, ceramic, such as, e.g., piezoelectric ceramic, carbon black or stone dust.

By the application of an inorganic lubricating and/or stabilizing agent according to the invention, the use of conventional finishes, i.e., of organic lubricating agents, is specifically no longer necessary per se, such that the latter can be omitted without substitution, e.g., in the production of fibers. It has been shown, however, that the application of inorganic lubricating agents according to the invention has a positive influence on conventional finishes in the sense that the latter then have little influence or actually no longer have a negative influence on the properties of the second additive, in particular the adsorption properties of adsorption agents, since the adsorption agent, e.g., activated carbon, is no longer saturated or is no longer saturated to the conventional extent.

It is shown that the mixture according to the invention or its application according to the invention is not used for a fiber or a molded part with inorganic particles, such that the properties of the fiber or the molded part lie only in the inherent properties of the inorganic particles. The properties that are achieved according to the invention that are special and that go beyond the inherent properties of individual parts are shown only in the combination of at least two different categories of inorganic particles.

Within the scope of the invention, known processes for the production of fibers can be applied in which the inorganic lubricating and/or stabilizing agent and the second additive are either stirred into a spinning solution and this fiber solution is then spun, or a main stream is produced from essentially pure polymer solution and a partial stream of polymer solution and additives that is separated from the main stream, and these two streams that were separated for the time being are then spun together.

In addition, the mixture according to the invention can be used in a spinning process and process for the production of yarn and braiding process, known in the art, such as, e.g., in the DREF process or the CORE process. With the mixture according to the invention and its application, it is possible to create yarns with specific cores (core filaments)/casing structures. In this connection, the core/the core filament (e.g., aramids or aromatic polyamides), which can be selected depending on the desired property, is braided with the fibers according to the invention. Thus, the properties of core/core filament and fibers, such as, e.g., adsorption capability, tensile strength, and heat resistance, can advantageously be combined with one another. Also, the mixture according to the invention can be used in the melt-blow process, for example for the production of fibrous fleece, and/or electro-spinning processes.

In the example of a lyocell process (N-methylmorpholine N-oxide, NMMNO), approximately up to 50% activated carbon and approximately up to 10% graphite powder can be admixed for the production of a fiber of cellulose that is dissolved to make it spinnable. Also, known wet-spinning processes can be applied according to the process according to the invention, in which, for example, graphite powder is also added to the spinning bath in addition to activated carbon.

In the process according to the invention, at least two additives are preferably spread essentially uniformly over the cross-section of the fiber.

The fibers or molded parts according to the invention can be further processed, i.a., in the form of textile sheet materials, such as, e.g., knitted fabrics, fleece, fibrous fleece, etc., for their use, for example, as protective clothing or athletic clothing, or in the form of films.

Further details, features and advantages of the invention follow from the description below with reference to the accompanying drawings, in which a preferred embodiment of the invention is depicted.

Here:

Figure 1:
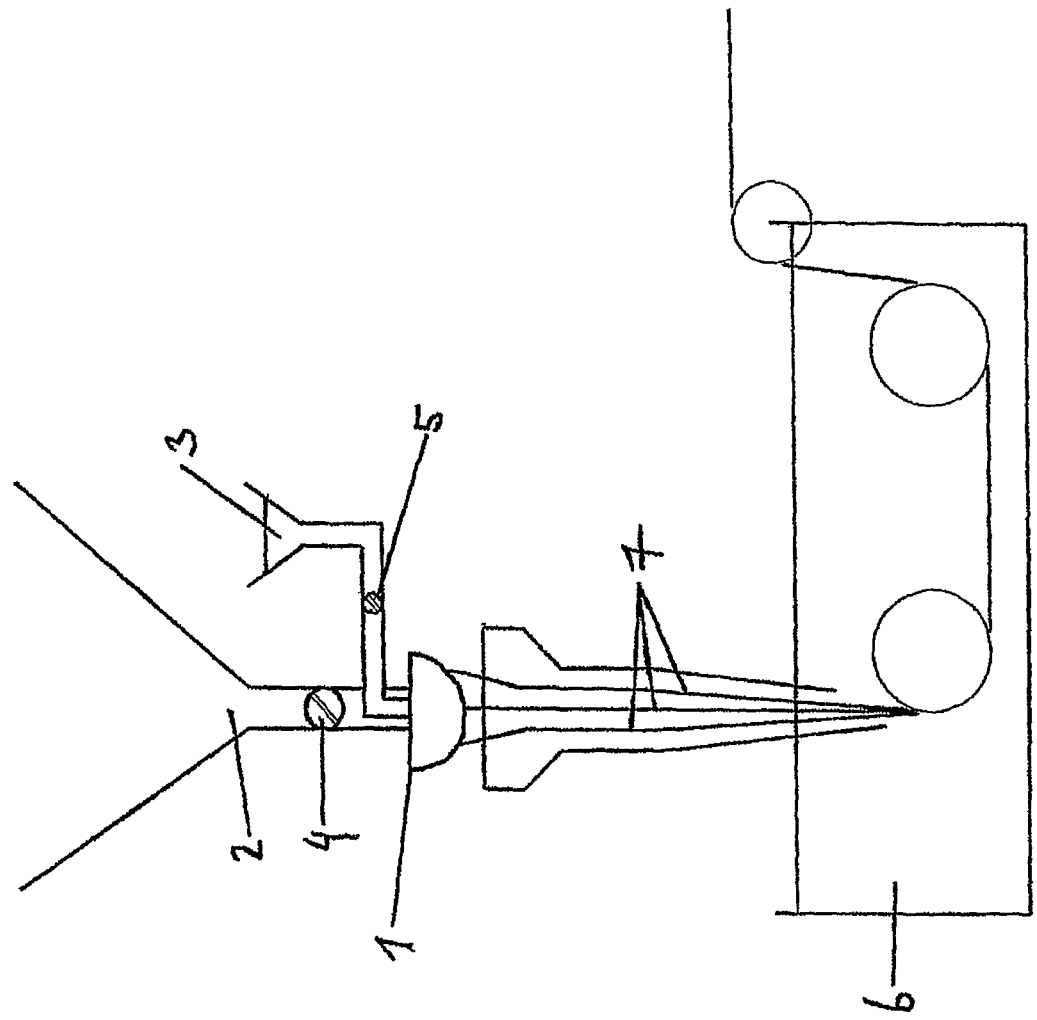
FIG. 1 shows a device for the production of a fiber according to the invention.

In FIG. 1, a device for the production of a fiber 7 according to the invention is depicted. In this embodiment, a spinnable mixture is produced, which is spun by means of a nozzle 1. The mixture is produced by a main stream 2 that consists of a pure polymer solution and a partial stream 3 that is separated from the main stream being brought together. The partial stream 3 is a suspension that contains a concentrated polymer solution, activated carbon as an adsorption agent, and graphite as an inorganic lubricating agent and agent for obtaining the stability of the spinning solution. Optionally, the partial stream 3 in addition can also contain an organic spinning finish.

Within the scope of the invention, other suitable adsorption agents and additives, such as, e.g., conventional, organic finishes, and also other inorganic lubricating and/or stabilizing agents can also be used. The partial stream can be treated by the action of high-frequency ultrasound.

The main stream 2 is conveyed via a pump 4, and the partial stream 3 is conveyed via another pump 5 to the nozzle 1. The main stream 2 and the partial stream 3 are brought together directly before the nozzle 1. This spinning solution is then spun into fibers 7.

As known from the prior art, the thus produced fibers 7 can be subjected to a washing process in a washing bath 6 and are cut to a certain length before further processing or are rolled into a roll for storage. With the fibers 7 according to the invention, textile sheet materials, such as, e.g., protective clothing, woven materials, electrically non-conductive products, etc., can be produced. Also, molded parts with advantageous adsorption and gliding properties can be produced.

The achievement of an elevated temperature stability as well as the fact that the absorption capacity of activated carbon is not impaired by graphite is to be illustrated in the following example of an embodiment of a mixture according to the invention as well as its application according to the invention.

In a spinning test, a test in principle for spinning a sample amount of lyocell fibers modified with activated carbon and graphite was initially scheduled as a first step. The fill level should be 30% activated carbon and 8% graphite relative to the cellulose, and the production should be implemented via partial stream 3-metering of an activated carbon/graphite suspension in NMMNO in the cellulose spinning solution.

The activated carbon/graphite suspension that is to be added into the partial stream 3 can be composed of, e.g., the following:

1,453 g of NMMNO (80%)—1,453 g of cellulose are dissolved in 80% NMMNO 607.3 g of Picactif (TS: 97.82%)—type of activated carbon 158 g of graphite, SLA 02

23.7 g of Lewatit TP 207 (TS: 90.73%)—weakly acidic cation exchanger 23.6 g of Lewatit VP OC 1065 (TS: 90.91%)—anion exchanger 24.15 g of NaOH (5%)

Lewatit is used as a complex binding agent, so-called exchanger, to bind particles, such as, e.g., iron or other metal particles, anionic, or cationic harmful substances. Within the scope of the invention, in addition to or as an alternative, other additives than the exchanger can also be used, whereby such substances are preferred that are not acidic or only a little acidic, since acidic substances have to be neutralized. In addition or as an alternative, within the scope of the invention, bases can also be used as additives in order to prevent the mixture from going into an acidic range.

The addition of certain additives can have a negative influence on the thermal stability of spinning solutions. In particular by the presence of a few heavy metals or by the addition of additives with active surfaces, exothermic processes are catalyzed with degradation of the solvent NMMNO, which can consequently even result in explosions.

Figure 2:
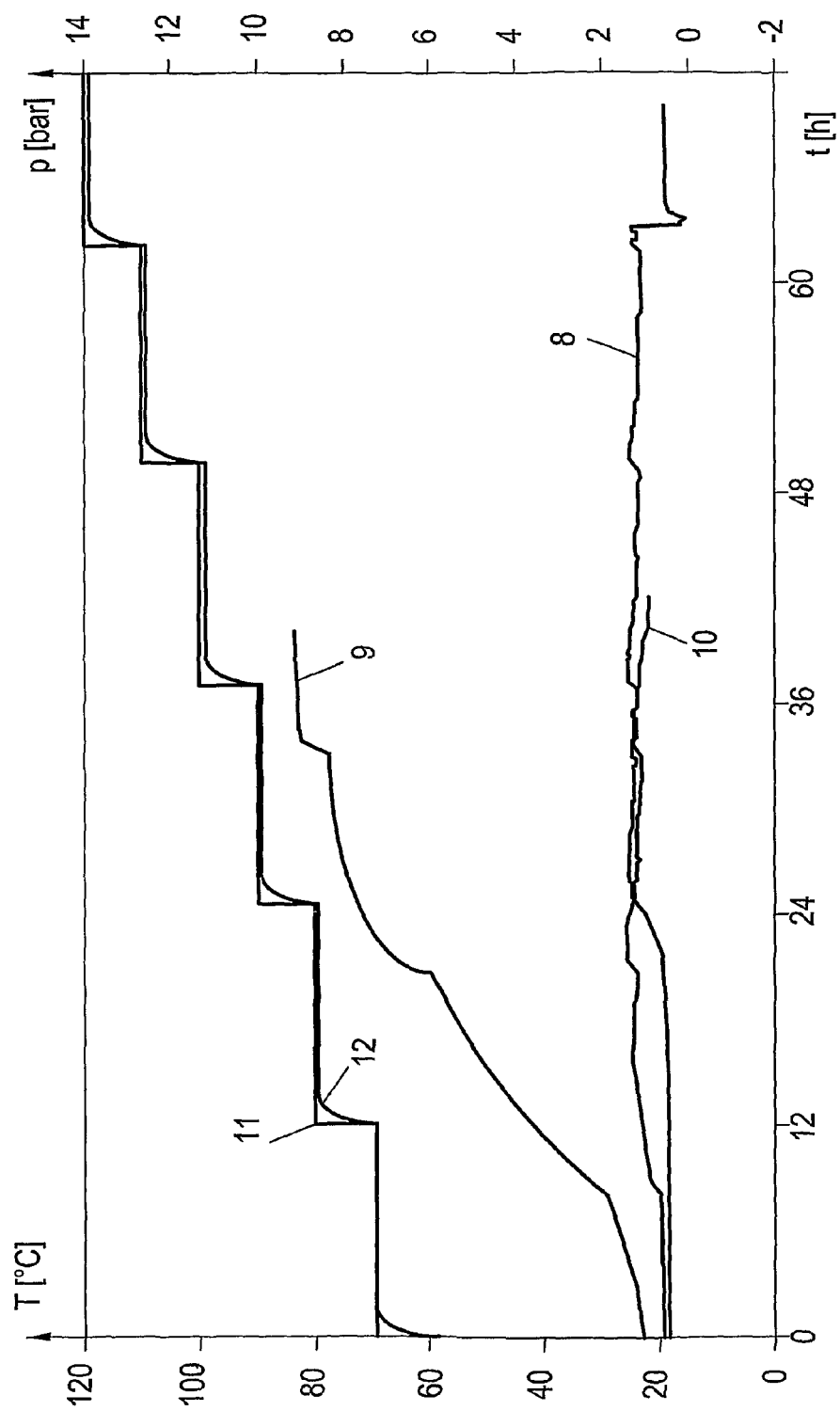
FIG. 2 shows a log of the mixture according to the invention.

When preparing the suspension, in practice no thermal effects were observed. The thermal stability of a sample of this suspension was examined in an extended time test over 72 hours in a miniature autoclave. Beginning at 70° C., the sample was stored isothermally for 12 hours before a stepby-step temperature increase by 10° C. up to 120° C. was completed every 12 hours. The simultaneously measured pressure in the autoclave is used as a measurement of the thermal stability. If it does not result in any pressure increase, a thermally stable suspension can be assumed. FIG. 2, in which "p" indicates the exact pressure in "bar," "T" indicates the measured temperature in "° C.," and "t" indicates the measured time in hours "h," shows a log of a stabilized activated carbon/graphite suspension 8 in comparison to a stabilized (with NaOH) activated carbon suspension 10 and a non-stabilized (without NaOH) activated carbon suspension 9. The latter shows a clear pressure increase as early as during the course of the first stage at 70° C., while the two stabilized suspensions do not show any displays of thermal instability. The setpoint temperature profile of the sample is identified as 11; the actual temperature profile of the sample is identified as 12.

In a further measurement in the miniature autoclave, the so-called onset temperature—the temperature that defines the beginning of a thermal effect—was determined. In this connection, the sample is subjected to a dynamic heating program with a heating rate of 1° C./minute. The onset temperature of the activated carbon/graphite suspension was determined at 109° C.—thus higher than the onset temperatures of the stabilized comparison samples (105° C.) and the non-stabilized comparison samples (100° C.).

With increasing temperature, the dissolved cellulose elevates the inherent pressure. An inherent pressure of 0 bar is ideal. This is achieved in a pure spinning solution by adding NaOH. As can be seen in FIG. 2, the pressure without NaOH theoretically increases up to a dangerous range (risk of explosion). When adding NaOH and graphite, a pressure of 0 bar is reached, i.e., better than or the same as only NaOH.

The results of the stability studies allow the conclusion that the weaving of the activated carbon/graphite-modified lyocell fibers can be performed safely. The results also allow the reasoning that the temperature stability of the activated carbon-graphite suspension is improved such that an action that goes beyond the actions of complex binding agents and NaOH was achieved.

Figure 3:
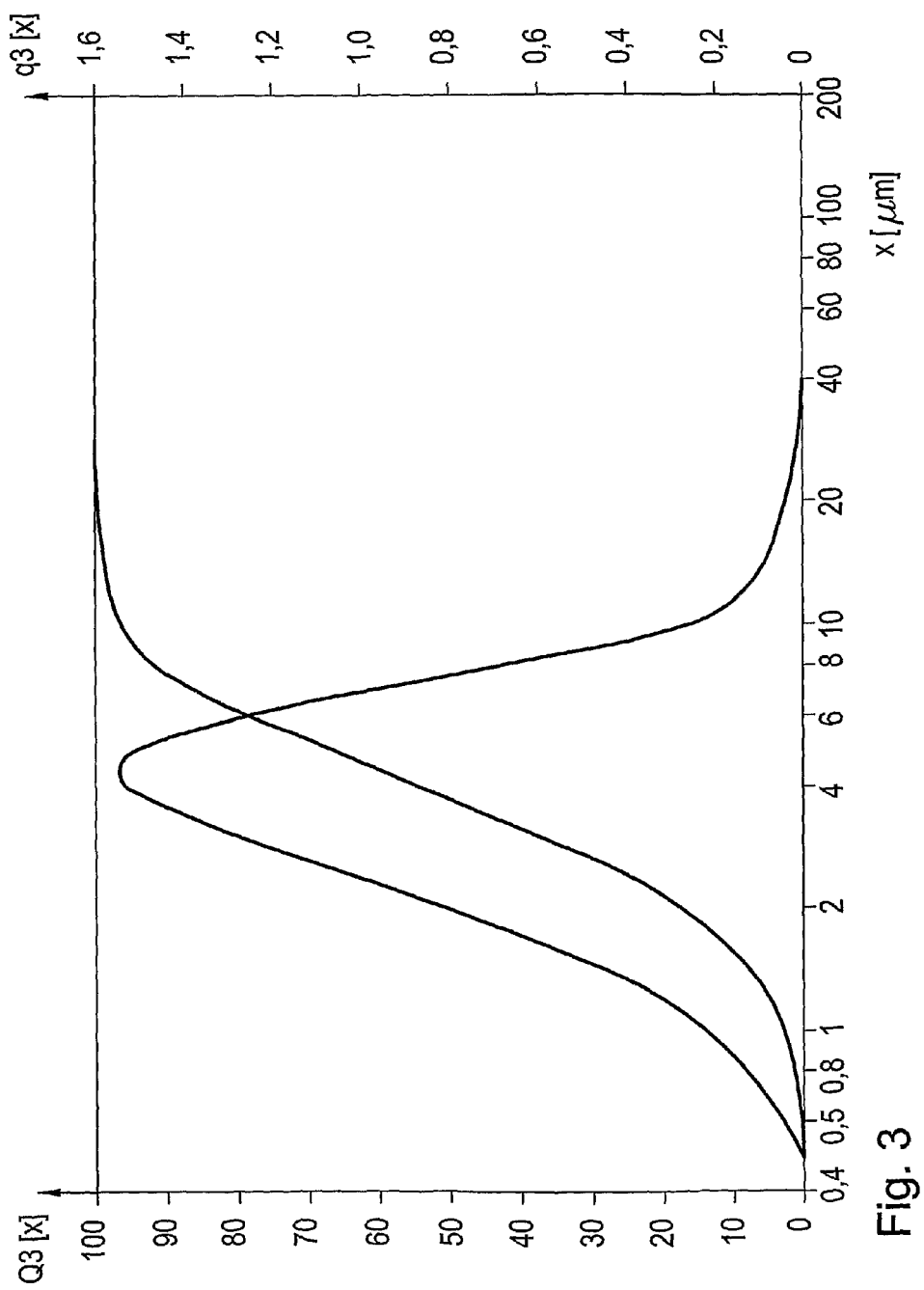
FIG. 3 shows a possible particle size distribution of the graphite that is used in the mixture according to the invention.

The ground graphite, e.g., SLA 02, can have an oversize particle $X_{99}$ of 10 μm or a particle size distribution as shown in FIG. 3. In FIG. 3, "x" is the particle size of the graphite in "μm," "q3(x)" is the density distribution of the graphite particles, and "Q3(x)" is the cumulative distribution of the graphite particles relative to their volumes.

The fiber cutting length can be 40 mm. Starting at 7 dtex, the fiber fineness can be successively increased as much as possible in the course of the weaving.

The production of fibers was carried out via sidestream 3-metering of a stabilized activated carbon/graphite suspension in NMMNO according to the above-mentioned composition in a cellulose spinning solution. The addition was adjusted so that the fill level of the fibers was 30% activated carbon and 8% graphite relative to the cellulose. By the mixing of the reactive activated carbon/graphite suspension directly in front of the spinning nozzle, a thermal degradation of the spinning solution is prevented.

The fibers were basically washed out with warm drinking water (approximately 50° C.) to remove NMMNO quantitatively.

| | |
|---|---|
| First washing overnight | (15 hours) |
| Second washing | (5 hours) |
| Third washing | (3 hours) |
| Fourth washing overnight | (15 hours) |
| Fifth washing | (3 hours) |
| Sixth washing | (3 hours) |
| Seventh washing | (3 hours) |
| Eighth washing overnight | (15 hours). |

The measured value of the determination of the residual content of N-methylmorpholine-N-oxide by means of HPLC after 8 washing cycles was always still very high at 3,600 mg/kg. In comparable studies on fibers modified exclusively with activated carbon, the NMMNO content could be pushed to below 100 mg/kg with 6 washing cycles.

The fiber parameters that are determined in a sample quantity of 50 fibers can be indicated as follows:

| Test Parameters | ME | |
|---|---|---|
| Fineness | Dtex | 4.18 |
| Tenacity | CN | 7.30 |
| Tenacity V | % | 28.0 |
| Expansion: Dry | % | 14.2 |
| Dry Fineness Tenacity | cN/tex | 17.5 |
| Impact Fineness Tenacity | cN/tex | 3.63 |
| E-modulus (0.5-0.7%) | cN/tex | 396 |

In the determination of the fiber composition by means of thermogravimetric analysis, a sample is subjected to a defined heating program. The mass loss that occurs based on the temperature is measured and characterizes the thermal decomposition of the material. A fiber sample was examined according to the following program: heating from 25.0 to 700.0° C. under nitrogen (heating rate 20 K/min, 30 ml of $N_2$/minute), and additional heating from 700.0 to 900.0° C. under oxygen (heating rate 20 K/minute, 30 ml of $O_2$/minute).

A TGA plot shows a three-stage decomposition. The moisture that is contained is initially released under nitrogen atmosphere before the cellulose matrix decomposes. With subsequent switching to oxygen, the graphite and activated carbon portions that are contained burn off. The table below indicates the proportions of the respective components in % by weight.

| | Percents by Mass |
|---|---|
| Volatile Components (Water) | 5.1% |
| Cellulose | 60.5% |
| Activated Carbon + Graphite | 34.6%* |
| Inorganic Components | — |

*Relative to the dry substance 36.5%

Samples of approximately 1 g fibers in each case were weighed exactly and then stored for 24 hours in toluene- or $CCl_4$-saturated atmosphere. Then, the fiber samples were weighed again, and the increase in weight was equated with the absorption of the respective substance.

| | |
|---|---|
| Toluene Absorption: | 5.5% |
| $CCl_4$ Absorption: | 10.1% |

Despite a content of residual NMMNO, very good absorption of the two model substances could be achieved. The latter range within the framework of fibers modified exclusively with activated carbon.

In summary, an embodiment of the invention can be depicted as follows:

A mixture contains a polymer solution, in particular a cellulose solution, a first additive in the form of an inorganic lubricating and/or stabilizing agent, e.g., graphite, and a second additive as an adsorption agent, e.g., activated carbon. The positive properties of the adsorption agent are not weakened but rather can even be improved by the inorganic lubricating and/or stabilizing agent.

The mixture can be used for the production of fibers or molded parts.

The invention claimed is:

1. A method of application of a mixture that contains a cellulose solution, with at least a first and a second additive, characterized in that the first additive is an inorganic lubricating and stabilizing agent, namely graphite, and wherein the second additive is an adsorption agent, namely activated carbon, comprising spinning the mixture for the production of a fiber (7).

2. The method of application according to claim 1, wherein a main stream (2) that consists of essentially pure cellulose solution and a partial stream (3) that consists of first and second additives and optionally other additives that is separated from the main stream are produced, and wherein the main stream (2) and the partial stream (3) are brought together as a mixture before the spinning.

3. The method of application according to claim 1, wherein the mixture is spun by means of a nozzle (1) and wherein the main stream (2) and the partial stream (3) are brought together directly before the nozzle (1).

4. The method of application according to claim 1, wherein the first and the second additives and optionally other additives are distributed essentially uniformly over the cross-section of the fiber (7).

5. The method of application according to claim 2, wherein the mixture is spun by means of a nozzle (1) and wherein the main stream (2) and the partial stream (3) are brought together directly before the nozzle (1).

* * * * *

UNITED STATES PATENT AND TRADEMARK OFFICE
CERTIFICATE OF CORRECTION

PATENT NO. : 8,709,272 B2
APPLICATION NO. : 12/673663
DATED : April 29, 2014
INVENTOR(S) : Josef Glaser It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 365 days.

Signed and Sealed this
Twenty-ninth Day of September, 2015

Michelle K. Lee
*Director of the United States Patent and Trademark Office*